(No Model.) 2 Sheets—Sheet 1.
A. G. CHRISTMAN.
COMBINED CULTIVATOR AND HOE.
No. 347,320. Patented Aug. 17, 1886.
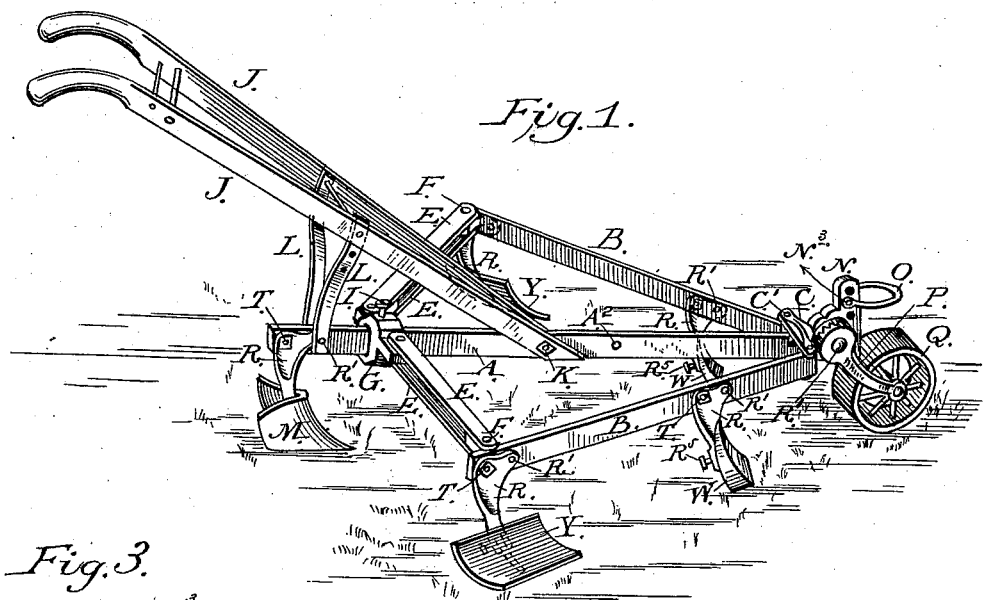
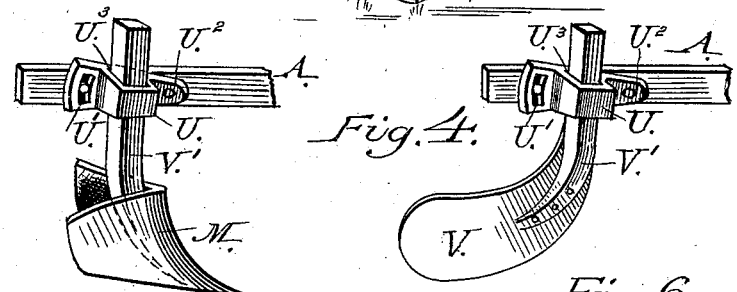
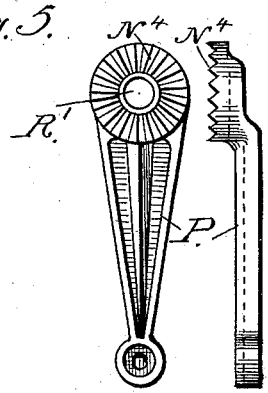
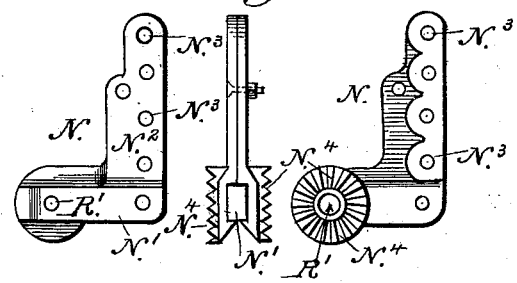
WITNESSES
F. W. Fowler
H. B. Applewhaite
INVENTOR
Augustus G. Christman
Thomas P. Kinsey
Attorney (No Model.) 2 Sheets—Sheet 2.
A. G. CHRISTMAN.
COMBINED CULTIVATOR AND HOE.
No. 347,320. Patented Aug. 17, 1886.
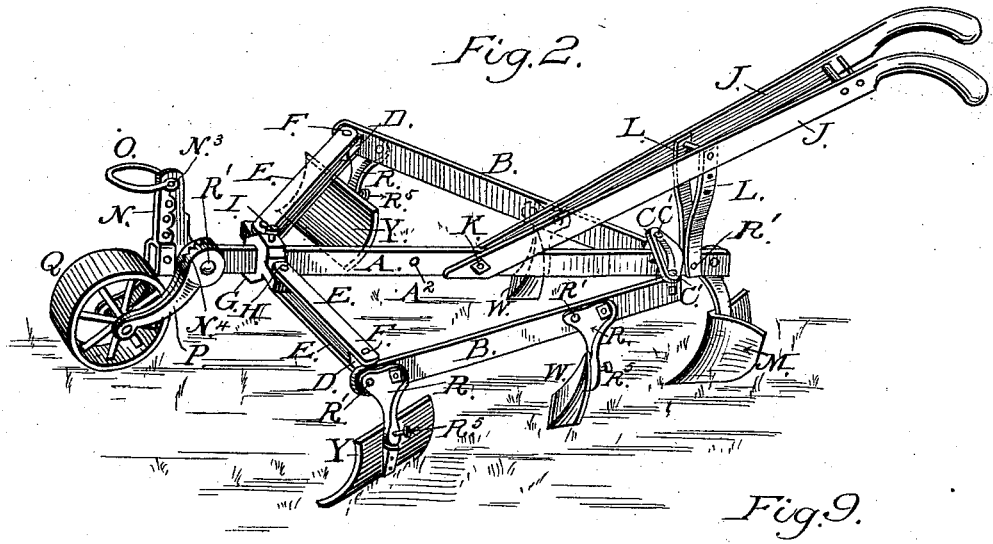
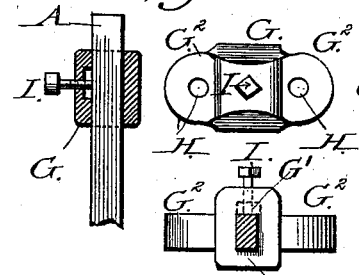
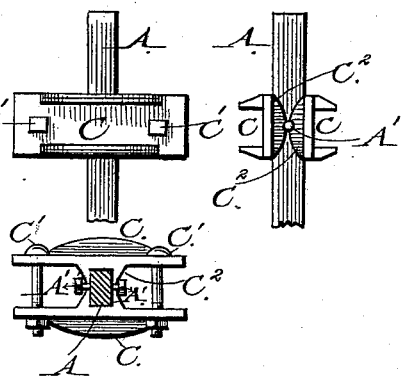
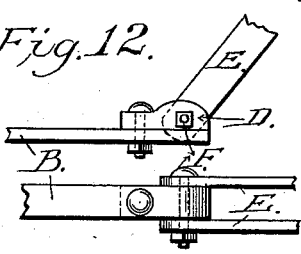
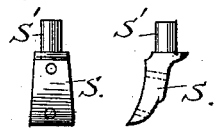
WITNESSES
T. W. Fowler
H. B. Applewhaite
INVENTOR
Augustus G. Christman
Thomas P. Kinsey
Attorney
N. PETERS. Photo-Lithographer, Washington, D. C.

UNITED STATES PATENT OFFICE.

AUGUSTUS G. CHRISTMAN, OF READING, PENNSYLVANIA, ASSIGNOR TO NATHAN S. ALTHOUSE, OF SAME PLACE.

COMBINED CULTIVATOR AND HOE.

SPECIFICATION forming part of Letters Patent No. 347,320, dated August 17, 1886.

Application filed November 9, 1885. Serial No. 182,300. (No model.)

*To all whom it may concern:*

Be it known that I, AUGUSTUS G. CHRISTMAN, a citizen of the United States, residing at the city of Reading, county of Berks, State of Pennsylvania, have invented a new and useful Improvement in Combined Cultivator and Hoe, of which the following is a specification.

This invention pertains more particularly to an improvement upon the same class of machines patented to myself as No. 306,219, October 7, 1884.

The object of the improvement is to further simplify the construction of the same, to give greater control of the teeth, shovels, and scrapers, and to so arrange the combination that as an operative cultivator it may be reversed in all its several parts, and be thereby adapted to be drawn forward with either its coned apex or its broad base in advance of the operator. These objects are attained in the use of a cultivator and hoe constructed in accordance with the drawings herewith, like letters of reference indicating like parts throughout.

Figure 1 represents, perspectively, the complete cultivator embodying my improvements, showing it as being drawn with its cone end forward, provided with two front teeth, two shovels or scrapers, and a rear double mold-board. Fig. 2 represents, perspectively, the same cultivator with its colter-wheel, teeth, shovels, mold-board, and handles reversed, and drawn with the broad or expanding end or base of the cone in advance of the operator. Fig. 3 represents an alternative attachment for the double mold-board, or for an evener, the clamp providing for an angular movement of the arm by the quadrant-slot, and the pivotal connection with the central bar, also for the vertical adjustment of the shovel or evener beam. Fig. 4 shows the same clamp applied to an evener. Fig. 5 represents the arms of the colter-wheel in reverse and side elevation; Fig. 6, a reverse end and front elevation of the clevis-head, showing the ratchet-seat, which, interlocking with the same device upon the arms of the colter-wheel, locks the same in position. Fig. 7 represents a flat corrugated washer, which, interlocking with similar corrugations upon the heads of the teeth, shovel, and scraper-arms, locks the same in vertical adjustment upon the frame. Fig. 8 is a transverse section, top plan, and end elevation of the sliding width-adjusting fulcrum-head. Fig. 9 represents a top plan, front and side elevation of the compound fulcrum-plates, showing the manner in which the same are locked upon the central-bar cross-pin by the fulcrum-bolts of the side bars, clamping the same between the transverse ribs; Fig. 10, rear and side elevation of one of the teeth, the blade in the side elevation, shown in section, exhibiting more clearly the quadrant-slot, and the corrugated face of the head the socketed arm with the male pin locked movably therein by the set-screw in the rear; Fig. 11, the male pin detached from the arm, secured to the tooth, shovel, &c., and adapted to move freely within the socket, whereby the angle of advance of the shovel, tooth, &c., horizontally may be changed by partially revolving the same within the socket. Fig. 12 represents in top plan and front elevation the fulcrum-block, with which the joint is made at both the free and fixed ends of the side bars, showing also in part the double links for expanding and contracting the width of the cultivator-base, by which a firmer connection is made with the central and side bars.

A represents the central bar of the frame, and B the outer bars of the same, and all are constructed of plain wrought-iron of about one and one-fourth inch by one-half inch cross-section, having no smith-work (outside of cutting the bars to length) put upon the same.

C represents the fixed swiveling joint-plate for the side bars; C′, clamping and fulcrum bolts to the same; C², cross-ribs which straddle the center bar and lock when clamped by the bolts C′ upon a pin, A′, driven into a hole drilled in the bar at the proper distance from the end of the same for that purpose.

The joint is made at both the fixed and movable ends of the side bars by a block, D, of cast-iron, (shown in Fig. 12,) and is covered by my former patent, to which allusion has been made, the clamping-bolts C′ forming the fulcrum-points at the fixed ends. At the movable ends double bars or expansion-links E E connect with the side bars, B, by fulcrum-bolts F, and with the sliding adjustable head G by bolts H. This arrangement of double links adds great stiffness to the connection. The head, as shown in Fig. 8, has an internal recess, G', for the reception of a common nut, thus saving labor in fitting up, and being readily renewed. A set-screw, I, serves to lock the head at any desired part of its movement. The head is provided with fulcrum-ears $G^2$ for the support of the double links E, and for the fulcrum-bolts H.

The handles J are connected with the central bar by holes $A^2$ and clip-bolts K, and are adjustably supported as to height by braces L, secured to the same, and by bolt R', which is also the fulcrum-point for the double mold-board M at the rear end of the cultivator.

At the advance end of the central bar I provide a clevis-head, N, constructed in two equal reverse halves, provided upon their inner faces with offsets N', which form shoulders resting upon the center bar, A, the faces $N^2$ clamping together over the same. A series of holes, $N^3$, serve to change the position of the clevis O upon the head. Corrugated seats $N^4$, with a bolt, R', serve to lock the colter-wheel arms P in adjustment as to height of cultivator-frame above ground.

Q is the colter-wheel.

R represents the teeth, shovel, or scraper arms, provided with a fulcrum-point, R', an oblong slot, $R^2$, for vertical adjustment, a corrugated face, $R^3$, placed central to the diameter of the socket-head $R^4$, so that the arm may be reversed upon the bar without any change in the position of the tooth W, shovel or scraper Y, relative to the bar upon which the change is made. The head $R^4$ is bored to admit and move freely therein the pivot or tenon S' of the palm S, which is secured to the tooth, shovel, or scraper to be used with the cultivator, and it is retained in removable connection therewith by the set-screw $R^5$ or its equivalent.

Oblong corrugated-faced bolt-washers T are used to interlock with the corrugated-faced arms, to prevent movement of the same after adjustment has been made.

The lower standard or palm, S, is so constructed that the tooth W, shovel M, or scraper Y may be interchangeably secured thereon. To attain this result the lower end or base of the palm is made considerably wider than at the top of the same, spreading out in a fan-like form, and the face above the upper bolt-hole being slightly rounded off, the face of the palm vertically being concave. Having this form, the scraper may be applied to a direct bearing; but when the tooth W or shovel M, which are of quite a different horizontal section are applied, then the fan-like base catches against the inner convex faces of the same, projecting the lower ends of the same forward, while the rounded face above the upper bolt-hole allows the tooth or shovel to hug closer to the top, thus securing the proper pitch or angle of penetration for the same over the almost vertical position necessary for the scraper.

The fulcrum and clamping bolts for the bars of the cultivator, which serve for the attachment of the teeth, shovels, &c., arms, also, for the clevis-head and double mold-board, are all placed equal distances from center to center for each attachment, so that the pieces are all interchangeable with each other, and may each be reversed in position upon the central or side bars of the cultivator. The holes $A^2$ are also so placed upon the central bar that the handles J may also be detached and changed to a reverse position to that usually occupied upon a cultivator.

A detachable clamp, U, provided with a quadrant-slot, U', and pivoted point $U^2$, with a clip-recess, $U^3$, provides a ready means for attachment of independent parts to be added for special purposes to the cultivator—as, for instance, an evener, V, a tined triturator, or a weed-cutting attachment. It will be seen that the clip gives vertical adjustment to the arm V', and the slot U' angular adjustment for penetration.

For harrowing of ground preparatory to planting or seeding, covering corn, &c., the cultivator may be run with the pointed or narrow end forward, the same as with the ordinary cultivator.

For cultivating crops it is of importance that the furrow made by the tooth running next the row of plants should not be left uncovered or open, but, on the contrary, should be filled up again as much as possible; and as all prior cultivators having the pointed or narrow end foremost are necessarily so constructed that the inner teeth precede the extreme side teeth, leaving only the center teeth to follow the latter ones, it is evident, from the very nature of the arrangement, that they fail to accomplish the desired object, since the course of the center tooth is not close enough to that of the extreme side teeth to fill up their furrows. In order to accomplish the desired object it is necessary that the extreme side teeth are followed and not preceded by the inner side teeth. As this is exactly the position the teeth are placed in when the cultivator is reversed, as shown in Fig. 2, the great advantage of running a cultivator and hoe with the wide or expanding end foremost when cultivating crops is so plain as not to be gainsaid, for when thus arranged the teeth are so placed that in the operation of cultivating, the furrows made by the teeth running next the row of plants are filled up again by the inner side teeth, and the furrows made by the latter are closed up by the center tooth or double mold-board M, thus leaving open only the center furrow between the two rows of plants.

As my improved cultivator is so constructed that at the option of the operator it may be changed from one style to the other to adapt it to the particular kind of work to be performed, and thereby do the work to the best advantage, and as the first cost of the reversible cultivator is not more than that of one not possessing this advantage, it is obvious that the art of farming is thereby cheaply enlarged.

I am aware that I am not the first to provide for the horizontal adjustment of the shovels or teeth of cultivators by a socket at the end of the standard and a tenon upon the shank or palm of the shovel or tooth. See Patent No. 130,454, August 13, 1872, L. K. Tipton, in which a threaded male tenon and correspondingly-threaded female socket are provided for the purpose of horizontal adjustment. This is practically an inoperative device, from liability to rust the parts together, and excessive cost of construction as compared with the simple plain socket and tenon of my improvement. I am also aware that I am not the first to produce a reversible cultivator. See Patents No. 86,502, February 2, 1869, Burbank, and Holms, No. 97,921, December 14, 1869, cultivators; but both differ so much in their mode of reversal and operation as virtually to make my cultivator a new departure from old modes, and a much more effective tool for the use of the farmer, being cheaper and more readily handled and adjusted.

Having shown the construction, use, and advantages of my improvement, I desire to claim as follows:

1. A clevis-head for a cultivator, &c., consisting of two equal-halved metal pieces provided with clamping-lugs for the central bar, and a series of clevis-bolt holes having ratchet-teeth seats upon their rear outer faces, in combination with ratchet-faced seats of the wheel-colter arms and interlocking therewith, secured to the central bar by a fulcrum-bolt through said ratchet-seats, and a clamping-bolt forward of same, as shown, described, and for the purpose set forth.

2. A fixed fulcrum-joint plate for the side bars of a cultivator-hoe, &c., composed of two equal or similar pieces of metal provided with central transverse ribs for the reception of the central bar, said ribs having a depth nearly equal to one-half the depth of said bar, and provided with semicircular recesses central to the same and adapted to be seated upon the bar, and clasp within said recesses a pin projected at equal distances through said bar, in combination therewith, and with the side bars by through clamping fulcrum-bolts and fulcrum-blocks, as described, and for the purpose set forth.

3. A reversible arm for a cultivator-hoe, provided at its top with a web-head central to the thickness of the arm, having a fulcrum-point upon the bars, adjustable for angle of penetration of tooth by a quadrantal slot and securing-bolt, the head corrugated around said slot, a socketed hub at its pendent end, with a set-screw or its equivalent, in combination with the bars of the cultivator, and with the tooth or shovel thereof, by tenons upon the palms of the same fitting in said socketed hub, as and for the purpose set forth.

4. A detachable lower standard or palm, S, adjustably secured, in combination with the upper standard or arm of a cultivator, by a tenon, socket, and set-screw, as shown and described, having its upper portion narrow and slightly convex, and its lower portion flat and spread out in fan-like form, with its vertical face concave, whereby the same is adapted to have interchangeably secured thereon a tooth, shovel, or scraper, as and for the purpose set forth.

AUGUSTUS G. CHRISTMAN.

Witnesses:
JAMES R. KENNEY,
DANIEL KILPATRICK.